United States Patent [19]

Nakano et al.

[11] Patent Number: 5,020,016
[45] Date of Patent: May 28, 1991

[54] CIRCUIT FOR DETECTING ZERO RESULT OF ADDITION/SUBTRACTION BY SIMULTANEOUSLY PROCESSING EACH PAIR OF CORRESPONDING BITS OF A PAIR OF GIVEN NUMBERS IN PARRALEL

[75] Inventors: Masako Nakano; Yutaka Yamagami, both of Tokyo, Japan

[73] Assignee: NEC Corporation, Tokyo, Japan

[21] Appl. No.: 345,253

[22] Filed: May 1, 1989

[30] Foreign Application Priority Data

Apr. 29, 1988 [JP] Japan .................................. 63-108863

[51] Int. Cl.$^5$ ................................................ G06F 7/50
[52] U.S. Cl. ................................................ 364/736.5
[58] Field of Search ...................... 364/736.5, 768, 784

[56] References Cited

U.S. PATENT DOCUMENTS 3,983,382  9/1976  Weinberger ...................... 364/736.5
4,815,019  3/1989  Bosshart ........................... 364/736.5
4,878,189  10/1989  Kawada ............................ 364/736.5

Primary Examiner—David H. Malzahn
Attorney, Agent, or Firm—Foley & Lardner

[57] ABSTRACT

A zero detection circuit operates to detect whether or not the result of addition/subtraction between a pair of binary numbers each composed of a plurality of bits becomes zero in all the plurality of bits. The zero detection circuit comprises a logic circuit receiving the pair of binary numbers A and B for generating a zero discrimination signal when anyone of the following four conditions is satisfied for each pair of bits of the same digit of the pair of binary numbers A and B:

a first condition: if (Ai, Bi)=(0,0), ($A^{i+1}$, $B^{i+1}$)=(0,0);
a second condition: if (Ai, Bi)=(0,0), ($A^{i+1}$, $B^{i+1}$)=(1,1);
a third condition: if (Ai, Bi)=(1,1), ($A^{i+1}$, $B^{i+1}$)=0,1) or (1,0); and
a fourth condition; if (Ai, Bi)=(1,0) or (0,1), ($A^{i+1}$, $B^{i+1}$)=(1,0) or (0,1)

where i is a natural number indicative of the digit place of the pair of binary numbers A and B.

9 Claims, 5 Drawing Sheets

(i + 1) th BIT    (i) th BIT (i + 1) th BIT    (i) th BIT (i + 1) th BIT    (i) th BIT

CIRCUIT FOR DETECTING ZERO RESULT OF ADDITION/SUBTRACTION BY SIMULTANEOUSLY PROCESSING EACH PAIR OF CORRESPONDING BITS OF A PAIR OF GIVEN NUMBERS IN PARRALEL

BACKGROUND OF THE INVENTION

1. Field of the Invention

The present invention relates to a zero detection circuit used in an electronic calculator or computer and more specifically to a zero detection circuit for detecting zero for all bits in a result of addition or subtraction between a pair of binary numbers.

2. Description of Related Art

Hitherto, so-called zero detection circuits have been used for detecting that a result of addition or subtraction between a pair of binary numbers composed of the same numbers of bits is zero from its most significant bit (MSB) to its least significant bit (LSB).

The zero detection has been executed as follows. The pair of binary numbers are added or subtracted to each other by an addition circuit or a subtraction circuit for each digit or place in the order counted from their LSB bit to their MSB bit, and the result of addition or subtraction for each digit is inputted to a NOR circuit. When the addition or subtraction has been completed from the LSB bit to the MSB bit, if the NOR circuit finally outputs a logic value "1", it is detected or judged that all bits of the result of addition or subtraction are zero.

In the above mentioned zero detection circuit, however, if the bit number of the binary numbers to be added or subtracted becomes large, the time from the start of the addition/subtraction to the completion of the addition/subtraction for the MSB bits becomes long. Therefore, the zero detection (the detection of all bits ="0") in the result of operation is correspondingly delayed. Namely, the efficiency of the zero detection becomes low.

Furthermore, the NOR circuit of the conventional zero detection circuit has been of a dynamic type in most cases. In the case that a dynamic NOR circuit is used, the zero detection of the addition/subtraction result has been performed as illustrated in the timing chart of FIG. 1.

Namely, the dynamic NOR circuit alternately repeats a precharge period $t_p$ and a sampling period $t_s$ in synchronism with a clock pulse as shown in FIG. 1. In the case of the addition, when the dynamic NOR circuit is in the sampling period, an addition output signal is inputted from an addition circuit to the dynamic NOR circuit with a delay time of $t_2$ from the start of the sampling period $t_s$, as shown in FIG. 1. This delay time $t_2$ is determined by a total time of a carry propagation time from a LSB to a MSB and an addition time for the MSB. In addition, as illustrated in FIG. 1, the dynamic NOR circuit generates an output signal after a delay time $t_3$ which is determined by the operation time of the dynamic NOR circuit itself.

As seen from the above, the conventional zero detection circuit has been such that when the sampling period is started, the zero detection is executed for the result of addition after a delay of $(t_2+t_3)$ in total from the start of the sampling period. Therefore, if the bit number of the binary numbers to be subjected to addition/subtraction becomes large, since the carry propagation time from the LSB to the MSB will inevitably increase, the delay time $t_2$ will become large as a matter of course. Accordingly, the delay of the zero detection will become more pronounced. This problem will also occur in the case of detecting zero in a result of subtraction.

SUMMARY OF THE INVENTION

Accordingly, it is an object of the present invention to provide a zero detection circuit which has overcome the above mentioned defect of the conventional circuit.

Another object of the present invention is to provide a zero detection circuit capable of detecting at a high speed and a high efficiency that all bits of a result of addition/subtraction are zero, even in the case that data to be subjected to addition/subtraction has a large number of bits.

A further object of the present invention is to provide a zero detection circuit capable of detecting whether or not all bits of a result of addition/subtraction are zero, in a parallel processing manner which enables a highly speed and high efficient zero detection.

The above and other objects of the present invention are achieved in accordance with the present invention by a zero detection circuit for detecting whether or not the result of addition/subtraction between a pair of binary numbers, each composed of a plurality of bits, becomes zero in all the plurality of bits, comprising a logic circuit receiving the pair of binary numbers A and B for generating a zero discrimination signal when anyone of the following four conditions is satisfied for each pair of bits of the same digit of the pair of binary numbers A and B:

a first condition: if $(A_i, B_i)=(0, 0)$, $(A_{i+1}, B_{i+1})=(0, 0)$;

a second condition: if $(A_i, B_i)=(0, 0)$, $(A_{i+1}, B_{i+1})=(1, 1)$;

a third condition: if $(A_i, B_i)=(1, 1)$, $(A_{i+1}, B_{i+1})=(0, 1)$ or $(1, 0)$; and a fourth condition: if $(A_i, B_i)=(1, 0)$ or $(0, 1)$, $(A_{i+1}, B_{i+1})=(1, 0)$ or $(0, 1)$ where i is a natural number indicative of the digit place of the pair of binary numbers A and B.

Preferably, the logic circuit generates the zero discrimination signal only when a pair of LSB bits $(A_1, B_1)$ of the pair of binary numbers A and B is neither $(0, 1)$ nor $(1, 0)$.

In a specific embodiment of the present invention, a zero detection circuit in accordance with the present invention for detecting whether or not the result of addition/subtraction between a pair of binary numbers, each composed of a plurality of bits, becomes zero in all the plurality of bits, comprises a plurality of logical circuits each receiving one pair of bits Ai and Bi of the same digit of the pair of binary numbers A and B (where i is a natural number indicative of the digit place of the pair of binary numbers A and B), and a discrimination circuit receiving a result of logical operation of each of the logical circuits for generating a zero discrimination signal when the results of logical operation of all the logical circuits are in the same predetermined condition, each of the logical circuits including a first logical stage having an OR circuit, an exclusive-OR circuit and an AND circuit each connected to receive one pair of bits Ai and Bi of the same digit of the pair of binary numbers A and B, and a second logical stage having a first NAND gate having a first input connected to an output of the NOR circuit and a second input connected to an output of the NOR circuit of the first logic stage of the logical circuit for a (i+1)th digit, a second NAND gate having a first input connected to the output of the NOR circuit and a second input connected to an output of the AND circuit of the first logic stage of the logical circuit for the (i+1)th digit, a third NAND gate having a first input connected to an output of the exclusive-OR circuit and a second input connected to an output of the exclusive-OR circuit of the first logic stage of the logical circuit for the (i+1)th digit, a fourth NAND gate having a first input connected to the output of the AND circuit and a second input connected to the output of the AND circuit of the first logic stage of the logical circuit for the (i+1)th digit, and an four-input AND gate connected to receive respective outputs of the first through fourth NAND gates for generating a logical signal for the discrimination circuit.

In an alternative form of the above mentioned circuit, the four NAND gates and the four-input AND gate are replaced by four AND gates and a four-input NOR gate, respectively.

More specifically, the discrimination circuit is composed of a dynamic NOR circuit, which includes unitary circuits the same in number as that of the logical circuits, and an a precharge line connected to a precharge voltage through a gate transistor which is turned on in response to a first clock pulse, the precharge line being connected through an output buffer to an output terminal, each of the unitary circuits including a first transistor having a control electrode connected to receive the logical signal outputted from a corresponding logical circuit, and a second transistor having a control electrode connected to receive a common second clock pulse, the first and second transistors being connected in series between the precharge line and a ground.

The dynamic NOR circuit can also include an additional unitary circuit including a first additional transistor having a control electrode connected to receive an output of the exclusive-OR circuit of the first logical stage of the logical circuit for a least significant bit pair of the pair of binary numbers A and B, and a second additional transistor having a control electrode connected to receive the common second clock pulse, the first and second additional transistors being connected in series between the precharge line and a ground.

The above and other objects, features and advantages of the present invention will be apparent from the following description of preferred embodiments of the invention with reference to the accompanying drawings.

DESCRIPTION OF THE PREFERRED EMBODIMENTS

First, the principle of zero detection which is executed in the zero detection circuit in accordance with the present invention will be described.

The following TABLES 1 and 2 illustrate two examples of addition in which all bits of the addition result (corresponding to full digits of an addend and an augend) become zero.

TABLE 1

| A | 10010011 |
|---|---|
| B | 01101101 |
| SUM | 100000000 |

TABLE 2

| A | 10110100 |
|---|---|
| B | 01001100 |
| SUM | 100000000 |

In the above tables, "A" indicates an augend, and "B" designates an added. Both of the augend and the addend are in a binary number and composed of 8 bits.

One rule which could be found from the above tables in the case that when a pair of binary numbers each composed of a plurality of bits are added to each other, is that the result of addition becomes zero in all bits of a portion corresponding to the LSB bit to the MSB bit of the augend "A" and the addend "B". This rule will be explained with reference to FIGS. 2A, 2B and 2C, in which an upper block indicates a bit data of the augend "A" and a lower block shows a bit data of the addend "B". In the following explanation, for simplification, ($A_i$, $B_i$) designates a combination of a (i)th bit of the augend "A" and a (i)th bit of the addend "B" (where i is a natural number indicative of the digit place of the pair of binary numbers A and B)

Figure 1:
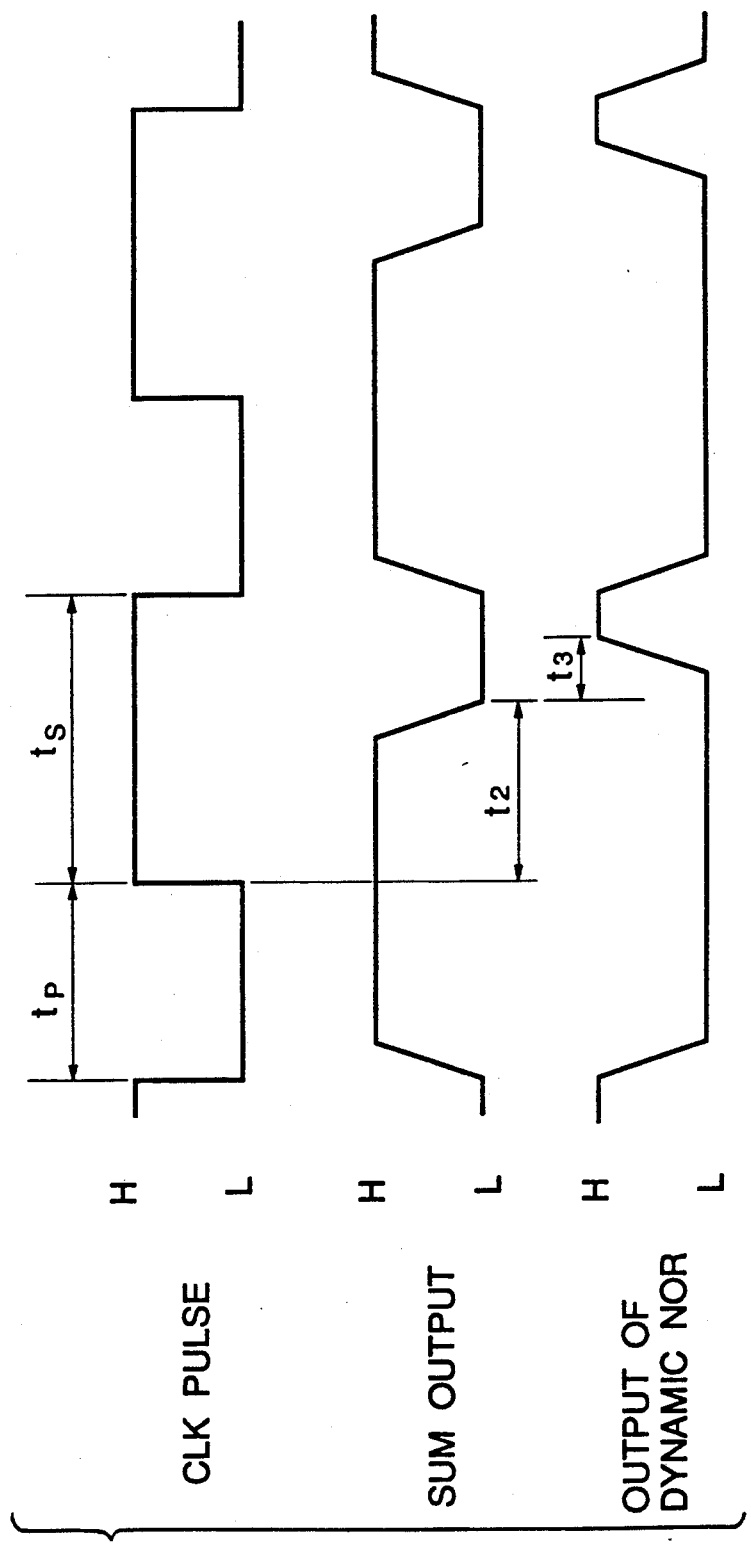
FIG. 1 is a prior art timing chart illustrating an operation of a conventional dynamic NOR circuit.
Figure 2A:
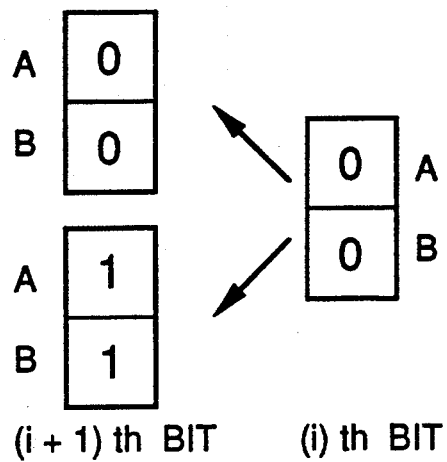
FIGS. 2A, 2B and 2C illustrate the principle of zero detection in accordance with the present invention.
Figure 2B:
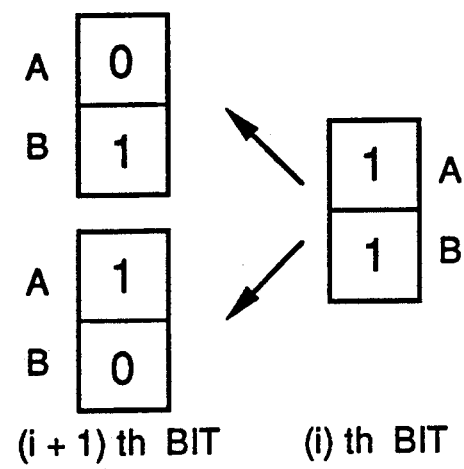
Figure 2C:
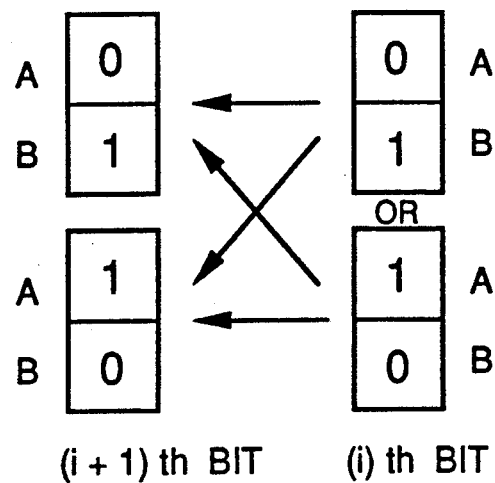

| Rule 1 | |
|---|---|
| As shown in FIG. 2A, in the case of ($A_i$, $B_i$) = (0, 0), | |
| ($A_{i+1}$, $B_{i+1}$) must be (0, 0) | First Condition |
| or ($A_{i+1}$, $B_{i+1}$) must be (1, 1) | Second Condition |
| Rule 2 | |
| As shown in FIG. 2B, in the case of ($A_i$, $B_i$) = (1, 1), | |
| ($A_{i+1}$, $B_{i+1}$) must be (0, 1) or (1, 0) | Third Condition |
| Rule 3 | |
| As shown in FIG. 2C, in the case of ($A_i$, $B_i$) = (1, 0) or (0, 1), | |
| ($A_{i+1}$, $B_{i+1}$) must be (1, 0) or (0, 1) | Fourth Condition |
| Rule 4 | |
| A combination of LSB bits ($A_1$, $B_1$) must be neither (0, 1) nor (1, 0) | Fifth Condition |

Incidentally, if the LSB bit of each of the augend and the addend is expanded toward a further less significant bit and "0" is put in the expanded bit, it becomes unnecessary to consider the fifth condition.

Accordingly, if discrimination is performed concerning whether or not the above mentioned first to fourth conditions or the first to fifth condition if necessary are satisfied, for each bit pair of the same digit or place of two binary numbers "A" and "B", it is possible to detect whether or not all bits of the result of addition/subtraction between the two binary numbers "A" and "B" are zero, without waiting for the result of the addition/subtraction.

In order to detect whether or not the above mentioned first to fourth conditions or the first to fifth condition if necessary are satisfied, a logic circuit can be used. Namely, for each arithmetic operation stage for each bit pair of the same digit or place of the augend "A" and the addend "B", an AND circuit can used to discriminate whether ($A_i$, $B_i$)=(1, 1) or not, and a NOR circuit can used to judge whether ($A_i$, $B_i$)=(0, 0) or not.

In addition, an EOR (exclusive-OR) circuit can be used to determine whether (Ai, Bi)=(1, 0) or (0, 1) or not.

Therefore, if a logical product (AND) between an output of the NOR circuit for the (i)th bit and an output of the NOR circuit for the (i+1)th bit is obtained, it is possible to discriminate whether the above mentioned first condition is satisfied or not.

If a logical product between an output of the NOR circuit for the (i)th bit and an output of the AND circuit for the (i+1)th bit is obtained, it is possible to discriminate whether the above mentioned second condition is satisfied or not.

If a logical product between an output of the AND circuit for the (i)th bit and an output of the EOR circuit for the (i+1)th bit is obtained, it is possible to discriminate whether the above mentioned third condition is satisfied or not.

If a logical product between an output of the EOR circuit for the (i)th bit and an output of the EOR circuit for the (i+1)th bit is obtained, it is possible to discriminate whether the above mentioned fourth condition is satisfied or not.

In addition, if an EOR is obtained for the LSB bit pair of the augend "A" and the addend "B", it is possible to discriminate whether the above mentioned fifth condition is satisfied or not.

Finally, if the negation of a logical sum (NOR) is obtained among the above mentioned logical products, it is possible to discriminate whether or not anyone of the first to fourth conditions is satisfied, in the (i)th arithmetic operation stage for the bit pair of the (i)the digit or place. In other words, if anyone of the above mentioned first to fourth conditions is satisfied, the negation of logical sum becomes a logic level of "0". Thus, it has been decided in the (i)th arithmetic operation stage that there is satisfied a condition necessary for the result of addition between a pair of bits in a (i)th digit and between another pair of bits in (i+1)th digit to become zero.

Thereafter, the negations of logical sum of all the arithmetic operation stages are supplied to one discrimination circuit so that a logical operation will be made for discriminating whether or not the negations of logical sum for all the arithmetic operation stages are at the same logical value "0". As a result, there is discriminated whether or not the result of addition is all zero in digits or places corresponding to the LSB to the MSB of the two binary numbers "A" and "B". For example, if the discrimination circuit is formed of a NOR circuit, when the result of addition is all zero from its LSB to its MSB, since the negation of logical sum for each arithmetic operation stage becomes a logical level of "0", the NOR circuit will generate a logical level of "1" as a discrimination result signal.

Incidentally, if the fifth condition should be taken into consideration, an output of the EOR circuit in the first arithmetic operation stage for the LSB bit is supplied to the discrimination circuit such as the NOR circuit.

The principle of the zero detection in accordance with the present invention can be applied not only to the above mentioned addition but also a subtraction. Namely, the principle of the zero detection can be used for discriminating that all bits of the result of subtraction are zero. In this case, it is possible to detect "all bits=0" by inputting a borrow into the expanded bit explained in connection with the fifth condition.

Accordingly, irrespective of a bit length of binary numbers to be subjected to addition/subtraction, it is possible to detect at a high speed and at a high efficiency that all the bits of the result of addition/subtraction are zero.

Figure 3:
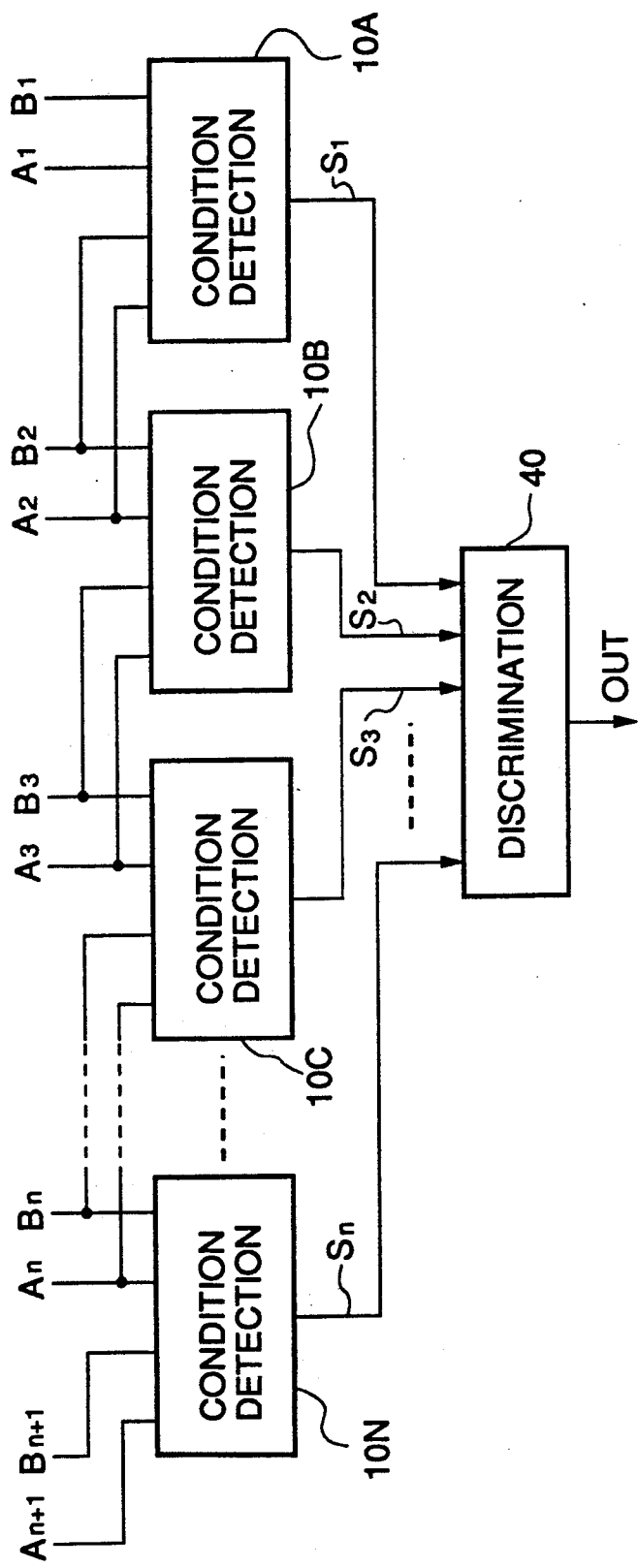
FIG. 3 is a conceptual block diagram of a zero detection circuit in accordance with the present invention.

Referring to FIG. 3, there is shown a conceptual block diagram of a zero detection circuit in accordance with the present invention. The shown zero detection circuit is configured to receive an augend "A" and an addend "B" each of which is a binary number composed of n bits (where n≧2). Therefore, the augend "A" and the addend "B" can be expressed as follows:

$$A = \sum_{k=1}^{n} A_k \cdot 2^{k-1}$$

$$B = \sum_{k=1}^{n} B_k \cdot 2^{k-1}$$

where k=natural number.

In addition, in FIG. 3, $A_{n+1}$ and $B_{n+1}$ are (n+1)th bit data formed when a carry is generated from the (n)th bit data.

The shown zero detection circuit comprises condition detection circuits 10A, 10B, ... 10N of the same number as the bit number (n) of the augend "A" and the addend "B". The condition detection circuits 10A, 10B, ... 10N execute the above mentioned logical operation to detect whether or not there is satisfied anyone of the above mentioned first and fourth conditions allowing the result of addition in a designated digit to become zero, for a pair of bits $(A_1, B_1)$, $(A_2, B_2)$, $(A_3, B_3)$, ... $(A_n, B_n)$ of the corresponding designated digit or place of the augend "A" and the addend "B". For this purpose, each of the condition detection circuits 10A, 10B, ... 10N receives a pair of bits $(A_i, B_i)$ of the same (i)th digit or place of the augend "A" and the addend "B" and another pair of bits $(A_{i+1}, B_{i+1})$ of a (i+1)th place more significant than the (i)th place by one bit. Specifically, the condition detection circuit 10A for a pair of LSB bits $(A_1, B_1)$ of the augend "A" and the addend "B" receives two pairs of bits $(A_1, B_1)$ and $(A_2, B_2)$ of the augend "A" and the addend "B". The condition detection circuit 10B for a pair of second less significant bits $(A_2, B_2)$ of the augend "A" and the addend "B" receives two pairs of bits $(A_2, B_2)$ and $(A_3, B_3)$ of the augend "A" and the addend "B".

Only when anyone of the above first to fourth conditions is established between a pair of bits $(A_i, B_i)$ of the same digit of the augend "A" and the addend "B" and another pair of bits $(A_{i+1}, B_{i+1})$ of a one-bit more significant digit, does each of the condition detection circuits 10A, 10B, ... 10N generate a detection signal $S_1$, $S_2, S_3, \ldots S_n$ of, for example, a logic value of "0", which is in turn supplied to a discrimination circuit 40. This descrimination circuit 40 generates a discrimination output signal of, for example, a logic value of "1", when all the condition detection circuits 10A, 10B, ... 10N output the detection signal of the logic value "0" indicating that the result of addition/subtraction is zero.

Figure 4:
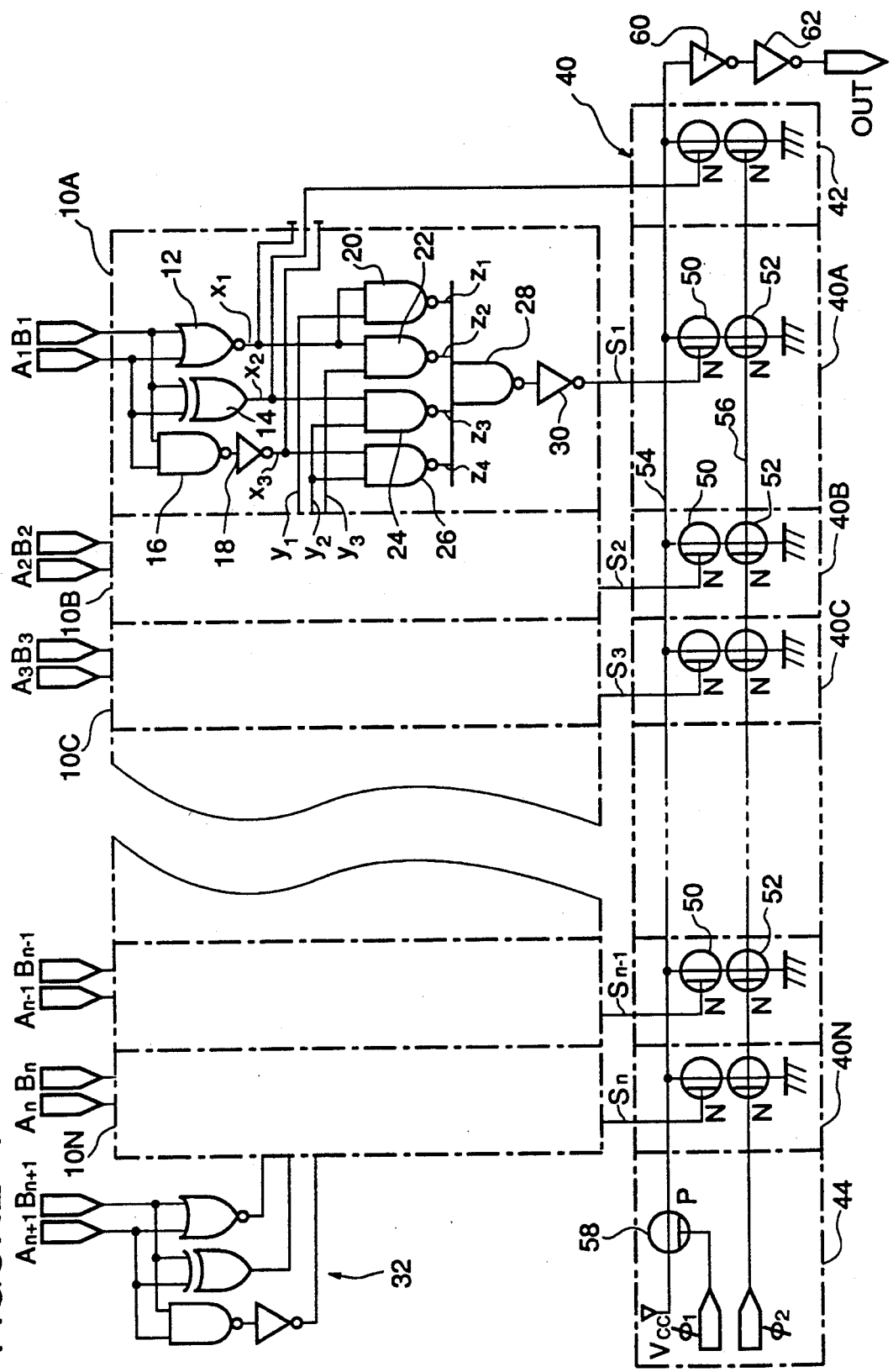
FIG. 4 is a detailed block diagram of one embodiment of the zero detection circuit in accordance with the present invention.

The condition detection circuits 10A, 10B, ... 10N can be of the same construction. Therefore, one example of a specific construction of the condition detection circuit 10A will be explained with reference to FIG. 4, which illustrates the detailed circuit of the zero detection circuit.

The condition detection circuit 10A includes a NOR circuit 12, an EOR circuit 14 and a NAND circuit 16, each of which has a first input connected to receive a least significant bit $A_1$ of the binary augend "A" and a second input connected to receive a least significant bit $B_1$ of the binary addend "B". An output of the NAND circuit 16 is connected to an inverter 18 so that the NAND circuit 16 and the inverter 18 constitute an AND circuit as a whole.

An output $x_1$ of the NOR circuit 12 is connected to one input of a NAND circuit 20, which has a second input connected to receive an output $y_1$ of a corresponding NOR circuit (not shown) of the condition detection circuit 10B for a second pair of bits $(A_2, B_2)$ of the augend "A" and the addend "B". The output $x_1$ of the NOR circuit 12 is also connected to one input of a NAND circuit 22, which has a second input connected to receive an output $y_3$ of an inverter (not shown) of the condition detection circuit 10B corresponding to the inverter 18 of the condition detection circuit 10A. In addition, an output $x_2$ of the EOR circuit 14 is connected to one input of a NAND circuit 24, which has a second input connected to receive an output $y_2$ of a corresponding EOR circuit (not shown) of the condition detection circuit 10B. An output $x_3$ of the inverter 18 is connected to one input of a NAND circuit 26, which has a second input connected to receive the output $y_3$ of the corresponding inverter (not shown) of the condition detection circuit 10B.

Outputs $z_1$ to $z_4$ of the NAND circuits 20 to 26 are respectively connected to a four-input NAND circuit 28, whose output is connected to an inverter 30. Therefore, the four-input NAND circuit 28 and the inverter 30 cooperate to form a four-input AND circuit which generates the detection signal $S_1$ to a corresponding unitary circuit 40A of the dynamic NOR circuit which constitutes the descrimination circuit 40. Furthermore, in order to discriminate whether or not the least significant bit pair $(A_1, B_1)$ of the binary augend "A" and the binary addend "B" fulfills the fifth condition mentioned hereinbefore, the output $x_2$ of the EOR circuit 14 is connected to a corresponding additional unitary circuit 42 of the discrimination circuit 40 (the dynamic NOR circuit).

With the above mentioned arrangement of the condition detection circuit 10A, if the relation between the least significant bit pair $(A_1, B_1)$ and the second bit pair $(A_2, B_2)$ of the binary augend "A" and the binary addend "B" fulfills anyone of the first to fourth conditions mentioned hereinbefore for allowing the result of addition to become zero, the detection output signal $S_1$ will be brought to a logical level "0".

The second to (n)th condition detection circuits 10B to 10N are configured to have the same construction as that of the condition detection circuit 10A, so as to generate the detection signal $S_2$ to $S_n$ to corresponding unitary circuits 40B to 40N of the dynamic NOR circuit (the discrimination circuit) 40.

A pair of bits $(A_{n+1}, B_{n+1})$ formed when a carry is generated from the most significant bit pair $(A_n, B_n)$ are inputted to a circuitry 32 which is arranged similarly to a circuit composed of the NOR circuit 12, the EOR circuit 14, the NAND circuit 16 and the inverter 18 in the condition detection circuit 10A. This circuitry 32 therefore outputs three signals similar to the output signals $x_1$, $x_2$ and $x_3$, to the condition detection circuit 10N for the most significant bit pair $(A_n, B_n)$.

As is well known to persons skilled in the art, a dynamic NOR circuit is configured to alternately repeat a precharge and a sampling for the purpose of generating a logic signal indicative a negation of a logical sum of input signals. In this embodiment, the shown dynamic NOR circuit 40 generates a logic signal indicative of a negation of a logical sum of the signal $x_2$ and the detection signals $S_1$ to $S_n$. For this purpose, the shown dynamic NOR circuit 40 includes the unitary circuit 42 receiving the signal $x_2$ of the first condition detection circuit 10A for the least significant bit pair $(A_1, B_1)$, the unitary circuits 40A to 40N receiving the detection signals $S_1$ to $S_n$ outputted from the first to (n)th condition detection circuits 10A to 10N, and a driving circuit 44 for driving the unitary circuits 42 and 40A to 40N.

Each of the unitary circuits 42 and 40A to 40N has a pair of n-channel MOSFETs (metal-oxide-semiconductor field effect transistor) 50 and 52 which are connected in series between a dynamic or precharge line 54 and a ground. The MOSFET 50 has a drain connected to the dynamic line 54 and a gate connected to receive the signal $x_2$ or a corresponding one of the detection signals $S_1$ to $S_n$. The source-grounded MOSFET 52 has a drain connected to a source of the MOSFET 50 and a gate connected to a common gate line 56.

The dynamic line 54 is connected through a p-channel precharge MOSFET 58 of the drive circuit 44 to a positive high voltage Vcc. The MOSFET 58 is connected at its gate to receive a precharge pulse $\phi_1$, and the common gate line 56 is connected to receive a sampling pulse $\phi_2$. In addition, the dynamic line 54 is connected through a pair of cascaded inverters 60 and 62 to an output terminal OUT. The pair of cascaded inverters 60 and 62 form an output buffer.

An operation of each unitary circuit of the dynamic NOR circuit 40 will be explained with reference to FIG. 5 which illustrates the timing chart of the clock pulse and the output of the dynamic NOR circuit.

Figure 5:
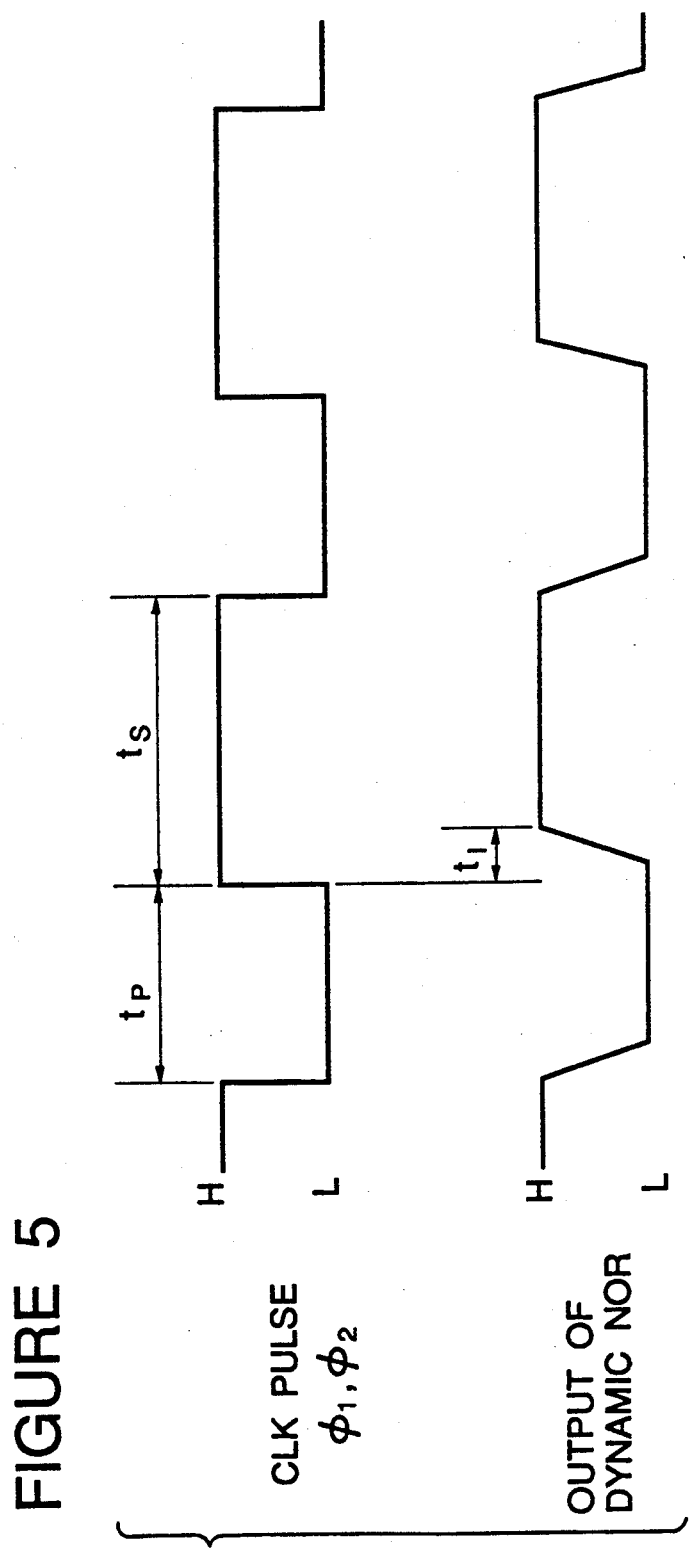
FIG. 5 is a timing chart illustrating an operation of the dynamic NOR circuit shown in FIG. 4.

If a negative portion $\phi_1$ of a clock pulse shown in FIG. 5 is applied to the p-channel precharge MOSFET 58 as a precharge control signal, the MOSFET 58 is turned on so that the dynamic line 54 is precharged to the electric supply voltage Vcc. At this time, the sourcegrounded MOSFETs 52 are maintained in an OFF condition. The precharge is performed for a period $t_p$. Thereafter, a positive portion $\phi_2$ of the clock pulse shown in FIG. 5 is applied to the (n+1) n-channel MOSFETs 52 as a sampling control signal, all the MOSFETs 52 are turned on. On the other hand, the precharge MOSFET 58 is turned off. The sampling is performed for a period $t_s$. Here, the precharge pulse $\phi_1$ and the sampling pulse $\phi_2$ are the same clock pulse, but can be independent of each other.

The signal $x_2$ of the least significant bit condition detection circuit 10A and the detection signals $S_1$ to $S_n$ outputted from the LSB to MSB condition detection circuits 10A to 10N are inputted to the gate electrodes of the corresponding n-channel MOSFETs 50, respectively. If all the signal $x_2$ of the least significant bit condition detection circuit 10A and the detection signals $S_1$ to $S_n$ are at a low level corresponding to the logical level "0", all the n-channel MOSFETs 50 are maintained off. Therefore, in the sampling period $t_s$, the electric charge on the dynamic line 54 will not be discharged, so that a potential substantially equal to the positive voltage Vcc is outputted from the dynamic line 54 to the output buffer composed of the pair of inverters 60 and 62. Accordingly, the output buffer generates a logic signal of "1" through the output terminal OUT after a delay time $t_1$ from a start of the sampling period $t_s$, as shown in FIG. 5. Thus, it is discriminated that the result of addition between the augend "A" and the addend "B" is all zero from its LSB bit to its MSB bit.

On the other hand, if at least one of the signal x2 of the first condition detection circuit 10A and the detection signals $S_1$ to $S_n$ is at a high level corresponding to the logical level "1", the n-channel MOSFET 50 receiving the high level signal at its gate will be turned on. Therefore, in the sampling period $t_s$, the electric charge on the dynamic line 54 will be discharged through the turned-on MOSFET 50 and the seriesconnected MOSFET 52 which has been turned on by the sampling pulse $\phi_2$, so that a low level signal is outputted from the dynamic line 54. Accordingly, the output buffer composed of the pair of inverters 60 and 62 generates a logic signal of "0" through the output terminal OUT. Thus, it is discriminated that the result of addition between the augend "A" and the addend "B" is not all zero from its LSB bit to its MSB bit.

As mentioned above, the dynamic NOR circuit 40 generates the negation of logical sum among the signal x2 of the first condition detection circuit 10A and the detection signals $S_1$ to $S_n$, and outputs the negation of logical sum through the output buffer to the output terminal OUT.

In the above mentioned embodiment, the logical operations of the first to (n)th condition detection circuits 10A to 10N are performed in parallel to one another. Therefore, the delay time $t_1$ is determined by a total time of a short operation time of the parallel logical operations and an operation time of the dynamic NOR circuit 40. Accordingly, the operation time required for discriminating zero in the result of addition will be decreased by $(t_2+t_3)=t_1$ in comparison with the conventional zero detection circuit.

In the above mentioned embodiment, it would be matter of course to a person skilled in the art, to replace a circuitry composed of the four NAND circuits 20 to 26 and the four-input NAND circuit 28, by a circuitry composed of four AND circuits and a four-input NOR circuit connected to outputs of the four AND circuits.

In addition, the dynamic NOR circuit 40 has been used in the above mentioned embodiment. However, a static NOR circuit can be used in place of the dynamic NOR circuit 40. In this case, the zero detection can be performed in the precharge period.

Furthermore, the above mentioned embodiment can discriminate whether or not all bits of the result of operation are zero, not only in the case of addition but also in the case of subtraction. In the case of subtraction, it is detected that all bits of the result of subtraction are zero, by adding a bit at a place further lower than a LSB bit of an input number pair and by inputting a borrow to the added bit.

As will be apparent from the above, the zero detection circuit in accordance with the present invention comprises a plurality of condition detection circuits each of which receives a corresponding pair of bits of the same digit of two binary numbers to be subjected to addition/subtraction, concurrently with and in parallel to the other condition detection circuits. The condition detection circuits simultaneously perform their logical operations and generate the result of their logical operations in parallel to those of the other condition detection circuits. The results of logical operations are concurrently inputted to the discrimination circuit, in which it is determined whether or not all bits of the result of operation become zero. Therefore, since it is not necessary to wait for the result of the actual addition/subtraction operation, the zero detection of the addition/subtraction result can be performed at a high speed and at high efficiency, even if the two numbers to be subjected to addition/subtraction have a long bit length.

The invention has thus been shown and described with reference to the specific embodiments. However, it should be noted that the present invention is in no way limited to the details of the illustrated structures but changes and modifications may be made within the scope of the appended claims.

We claim:

1. A zero detection circuit for detecting whether or not a result of addition/subtraction between a pair of binary numbers A and B, each of said binary numbers composed of a plurality of bits, becomes zero for all of said plurality of bits, comprising:

a logic circuit for receiving said pair of binary numbers A and B and generating an active unitary discrimination signal, said logic circuit including unitary logic circuits in number corresponding to a maximum digit number of said pair of binary numbers A and B, each of said unitary logic circuits including first logic means for generating a first logic signal when a first condition is fulfilled, said first condition being if (Ai, Bi)=(0, 0), $(A_{1+1}, B_{i+1})$=(0, 0), where suffix "i" is a natural number indicative of a digit place of said pair of binary numbers A and B, second logic means for generating a second logic signal when a second condition is fulfilled, said second condition being if (Ai, Bi)=(0, 0), $(A_{i+1}, B_{i+1})$=(1, 1), third logic means for generating a third logic signal when a third condition is fulfilled, said third condition being if (Ai, Bi)=(1, 1), $(A_{i+1}, B_{i+1})$=(0, 1) or (1, 0), fourth logic means for generating a fourth logic signal when a fourth condition is fulfilled, said fourth condition being if (Ai, Bi)=(1,0) or (0, 1), $(A_{i+1}, B_{i+1})$=(1, 0) or (0, 1), and output logic means receiving said first to fourth logic signals for generating said active unitary zero discrimination signal when any one of said first to fourth conditions is fulfilled;

an auxiliary logic circuit for generating an active auxiliary detection signal only when a pair of least significant bits $(A_1, B_1)$ of said pair of binary numbers A and B is neither (0, 1) nor (1, 0); and an output circuit receiving said unitary zero discrimination signal from said output logic means and said auxiliary detection signal from said auxiliary logic circuit for generating a zero discrimination signal when both said unitary zero discrimination signal and said auxiliary detection signal are active.

2. A zero detection circuit for detecting whether or not a result of addition/subtraction between a pair of binary numbers, each of said binary numbers composed of a plurality of bits, becomes zero for all of said plurality of bits, comprising:

a plurality of logical circuits each receiving one pair of bits Ai and Bi of the same digit of said pair of binary numbers A and B, where i is a natural number indicative of the digit place of said pair of binary numbers A and B; and a discrimination circuit receiving results of logical operation of each of said logical circuits for generating a zero discrimination signal when said results of logical operation of all said logical circuits are in the same predetermined condition;

each of said logical circuits including a first logical stage having a NOR circuit, an exclusive-OR circuit and an AND circuit each connected to receive one pair of bits Ai and Bi of the same digit of said pair of binary numbers A and B, and a second logical stage having a first NAND gate having a first input connected to an output of said NOR circuit and a second input connected to an output of a NOR circuit of said first logic stage of a logical circuit for a (i+1)th digit, a second NAND gate having a first input connected to said output of said NOR circuit and a second input connected to an output of an AND circuit of said first logic stage of said logical circuit for said (i+1)th digit, a third NAND gate having a first input connected to an output of said exclusive-OR circuit and a second input connected to an output of an exclusive-OR circuit of said first logic stage of said logical circuit for said (i+1)th digit, a fourth NAND gate having a first input connected to said output of said AND circuit and a second input connected to said output of said AND circuit of said first logic stage of said logical circuit for said (i+1)th digit, and a four-input AND gate connected to receive respective outputs of said first through fourth NAND gates for generating a logical signal as a result to be received by said discrimination circuit.

3. A circuit claimed in claim 2 wherein said discrimination circuit is composed of a NOR circuit.

4. A circuit claimed in claim 3 wherein said NOR circuit is of a dynamic type and includes unitary circuits in number the same as that of said logical circuits, and a precharge line connected to a precharge voltage through a gate transistor which is turned on in response to a first clock pulse, said precharge line being connected through an output buffer to an output terminal, each of said unitary circuits including a first transistor having a control electrode connected to receive said logical signal outputted from a corresponding logical circuit, and a second transistor having a control electrode connected to receive a common second clock pulse, said first and second transistors being connected in series between said precharge line and ground.

5. A circuit claimed in claim 4 wherein said NOR circuit of a dynamic type includes an additional unitary circuit including a first additional transistor having a control electrode connected to receive an output of said exclusive-OR circuit of said first logical stage of said logical circuit for a least significant bit pair of said pair of binary numbers A and B, and a second additional transistor having a control electrode connected to receive said common second clock pulse, said first and second additional transistors being connected in series between said precharge line and ground.

6. A zero detection circuit for detecting whether or not a result of addition/subtraction between a pair of binary numbers, each of said binary numbers composed of a plurality of bits, becomes zero for all of said plurality of bits, comprising:

a plurality of logical circuits each receiving one pair of bits Ai and Bi of the same digit of said pair of binary numbers A and B, where i is a natural number indicative of the digit place of said pair of binary numbers A and B; and a discrimination circuit receiving results of logical operation of each of said logical circuits for generating a zero discrimination signal when said results of logical operation of all said logical circuits are in the same predetermined condition;

each of said logical circuits including a first logical stage having a NOR circuit, an exclusive-OR circuit and an AND circuit each connected to receive one pair of bits Ai and Bi of the same digit of said pair of binary numbers A and B, and a second logical stage having a first AND gate having a first input connected to an output of said NOR circuit and a second input connected to an output of a NOR circuit of said first logic stage of a logical circuit for a (i+1)th digit, a second AND gate having a first input connected to said output of said NOR circuit and a second input connected to an output of an AND circuit of said first logic stage of said logical circuit for said (i+1)th digit, a third AND gate having a first input connected to an output of said exclusive-OR circuit and a second input connected to an output of an exclusive-OR circuit of said first logic stage of said logical circuit for said (i+1)th digit, a fourth AND gate having a first input connected to said output of said AND circuit and a second input connected to said output of said AND circuit of said first logical stage of said logical circuit for said (i+1)th digit, and a four-input NOR gate connected to receive respective outputs of said first through fourth AND gates for generating a logical signal as a result to be received by said discrimination circuit.

7. A circuit claimed in claim 6 wherein said discrimination circuit is composed of a NOR circuit.

8. A circuit claimed in claim 7 wherein said NOR circuit is of a dynamic type and includes unitary circuits of the same in number as that of said logical circuits, and an a precharge line connected to a precharge voltage through a gate transistor which is turned on in response to a first clock pulse, said precharge line being connected through an output buffer to an output terminal, each of said unitary circuits including a first transistor having a control electrode connected to receive said logical signal outputted from a corresponding logical circuit, and a second transistor having a control electrode connected to receive a common second clock pulse, said first and second transistors being connected in series between said precharge line and ground.

9. A circuit claimed in claim 8 wherein said NOR circuit of a dynamic type includes an additional unitary circuit including a first additional transistor having a control electrode connected to receive an output of said exclusive-OR circuit of said first logical stage of said logical circuit for a least significant bit pair of said pair of binary numbers A and B, and a second additional transistor having a control electrode connected to receive said common second clock pulse, said first and second additional transistors being connected in series between said precharge line and ground.

* * * * *